J. H. A. MORICHARD.
INDICATING APPARATUS FOR MAPS AND CHARTS.
APPLICATION FILED JULY 25, 1916.

1,279,403.

Patented Sept. 17, 1918.
3 SHEETS—SHEET 1.

Inventor
Jean Henri Adrien Morichard
By Carl P. Goepel
his Attorney

J. H. A. MORICHARD.
INDICATING APPARATUS FOR MAPS AND CHARTS.
APPLICATION FILED JULY 25, 1916.
1,279,403.
Patented Sept. 17, 1918.
3 SHEETS—SHEET 2.
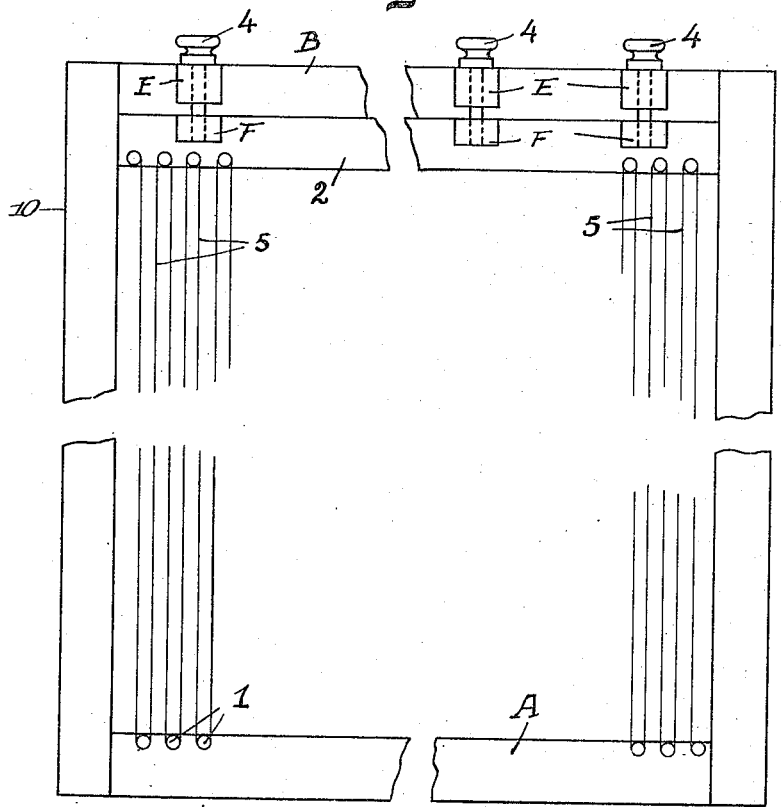
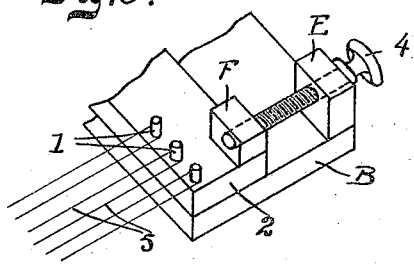
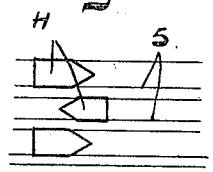
Inventor
Jean Henri Adrien Morichard
By Earl P. Cooper
his Attorney J. H. A. MORICHARD.
INDICATING APPARATUS FOR MAPS AND CHARTS.
APPLICATION FILED JULY 25, 1916.
1,279,403.
Patented Sept. 17, 1918.
3 SHEETS—SHEET 3.
Fig. 12.
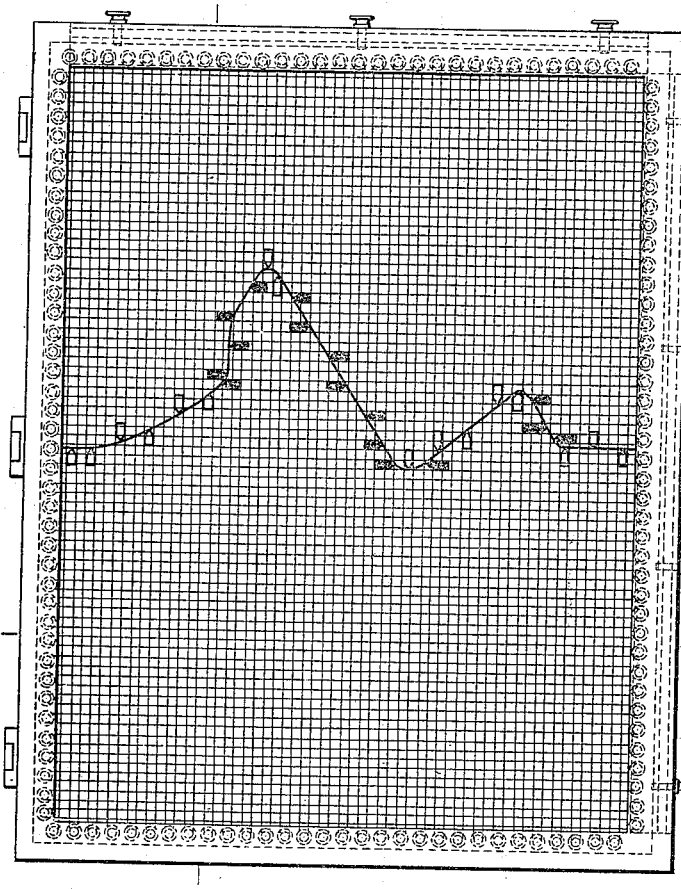
Fig. 11.
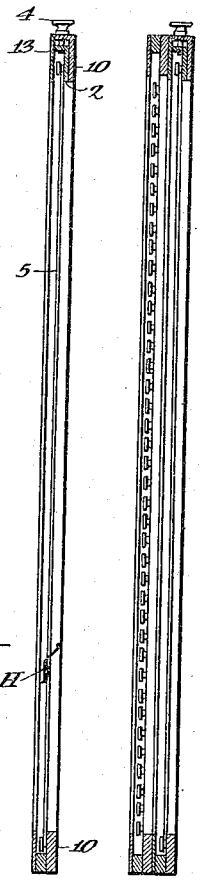
Fig. 14.
Fig. 13.
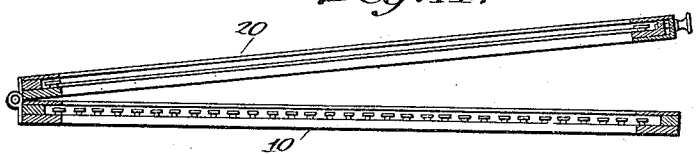
Fig. 10.
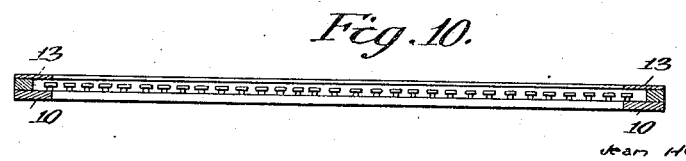
Inventor:
Jean Henri Adrien Morichard
By Carl P. Draper
his Attorney

UNITED STATES PATENT OFFICE.

JEAN HENRI ADRIEN MORICHARD, OF AMSTERDAM, NETHERLANDS.

INDICATING APPARATUS FOR MAPS AND CHARTS.

1,279,403.  Specification of Letters Patent. Patented Sept. 17, 1918.

Application filed July 25, 1916. Serial No. 111,114.

*To all whom it may concern:*

Be it known that I, JEAN HENRI ADRIEN MORICHARD, engineer, a subject of the Kingdom of the Netherlands, residing at Amsterdam, Netherlands, 415 Marnixstraat, have invented certain new and useful Improvements in Indicating Apparatus for Maps and Charts, whereof the following is a specification.

This invention has relation to means or arrangements for indicating graphically information or positions on plans, maps, charts or the like, hereinafter included in the term charts, and the invention has for its object to provide simple and efficient means to that end.

For this purpose, means or arrangements in accordance with this invention, comprise a frame between opposed members or parts of which wires or the like are strung and strained parallel to one another and indicators movably mounted and held on said wires, the arrangement being such that when it is desired to give or obtain a graphical indication, the frame is placed upon a chart, and the indicators are adjusted in the wires.

The frame, as will be obvious, is removable from one chart and can be removed from one chart and placed upon another. If the indicators have been adjusted in relation to one chart so as to give a graphical indication, they will, if the frame be removed and placed upon another chart without alteration or adjustment of the indicators, give either the same graphical indication or one comparable with information contained on the second chart.

In order that the invention may be clearly and readily understood, reference will now be made to the accompanying drawings.

Figure 1 of the accompanying drawings represents a diagrammatic plan view of an apparatus embodying this invention.

Fig. 2 represents on a larger scale the frame carrying the wire straining and holding means, parts being broken out.

Fig. 3 represents on a larger scale a perspective view of a corner of said frame showing the stretcher bar and means for adjusting it.

Fig. 9 represents a plan view of a fragment of the stretched wires provided with indicators, the wires being relatively disposed so as to permit indicators to pass one another.

Fig. 10 represents a transverse section of said frame provided with a protective skeleton frame.

Fig. 11 represents a longitudinal section thereof.

Fig. 12 represents a plan view of a duplex indicating apparatus embodying two stretching frames with wires disposed at right angles respectively.

Fig. 13 represents a longitudinal section thereof.

Fig. 14 represents a transverse section thereof.

The same reference numbers indicate corresponding parts in the different figures.

Figure 1:
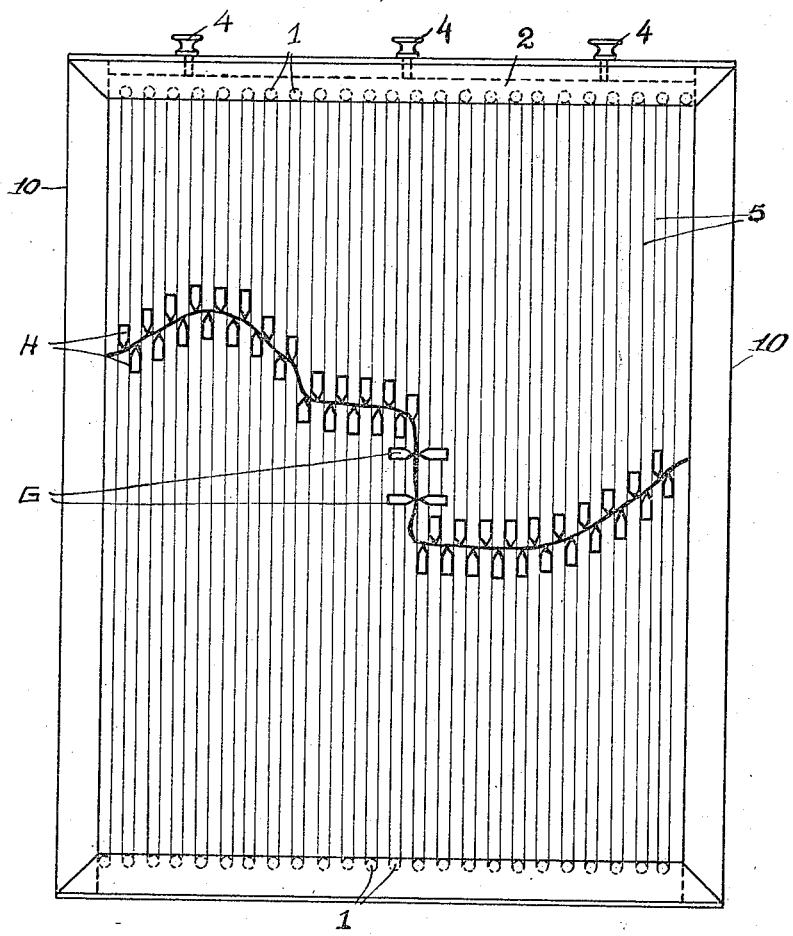

In the form illustrated in Figs. 1 and 2 the apparatus comprises a rectangular frame 10.

Figure 4:
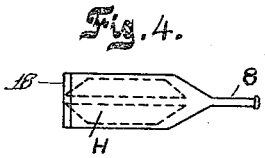
Fig. 4 represents a plan view of a large scale of one of the movable indicators adjustable on the stretched wires of said frame.
Figure 5:
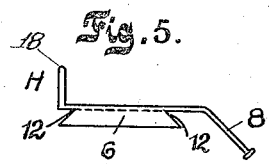
Fig. 5 represents a side elevation of a modified form of one of said movable indicators.
Figure 6:
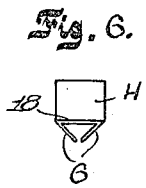
Fig. 6 represents a side elevation of the indicator shown in Fig. 4.

A is one of the members of the frame on which wire holding means comprising a plurality of pins, studs or other holding means 1, are mounted. B is the opposed member of the frame. This member carries lugs E. 2 is a bar mounted on and movable upon the member B (Fig. 3). This bar is also provided with lugs F and has a plurality of pins or studs 1 mounted thereon. A plurality of suitable thumb screws 4 pass through the lugs E into tapped holes in the lugs F. The position of the bar 2 is adjusted by rotating the thumb screws 4. These adjusting screws need not necessarily be of the kind shown, but may be of other pattern. If desired, the bar 2 may, instead of being made in one length, be made in a number of lengths, 5 is a piece of wire, such as piano wire. One end of the wire is secured to the member A and the wire is then passed around the pins or studs 1 as shown in Fig. 1. The other end of the wire is then secured to the bar 2. Of course, both ends of the wire would be attached to the member A, or to the bar 2, if the wire made one more span than shown on the drawing. The wire 5 is maintained taut by adjusting the bar or bars 2 in relation to the member B. If more than one bar 2 be employed, there will, or may be, as many lengths of wire as there are bars 2. Or, instead of having the wire or wires 5 arranged as described, a number of wires each of a length to extend across the frame could be employed, in which case the wires could or would be anchored at one end and connected at the other to tension adjusting means, such as are employed in pianos. H are the indicators. Their construction will be apparent from the drawings where they are shown in plan in Fig. 4, in side elevation in Fig. 5 and in rear elevation in Fig. 6. The indicators are clipped on to the wires 5 by means of clips or hooks formed by bending over inwardly the edges 6. It will be obvious that each indicator is clipped and sprung into position on two adjacent parallel lengths of the wire 5. Each indicator is preferably provided with a pointer 8 which extends downward between the parallel wires with which it engages and with an upward lug 18 which serves as a handle by which the indicator is slid along the wires. The indicator can be slid along its wires until its indication end is above the desired object or position to be indicated. The width of the indicators is less than the distance between adjacent lengths of wires 5: when, therefore, an indicator is clipped on to the wires 5, they are pulled the one toward the other. By this means an indicator is held firmly in position and prevented from free longitudinal movement or from slipping off the wires.

Figure 7:
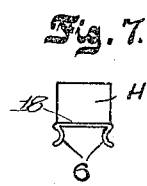
Fig. 7 represents a side elevation of another form of indicator.

In Fig. 7 is shown in end elevation an indicator having a different form of clip or hook and formed by bending over the edges 6 first inwardly and then outwardly. Indicators provided with this form of clip or hook are wider than the distance between adjacent lengths of wire so that when in position thereon, the lengths are moved away from one another. An indicator as shown in Fig. 7 is as firmly maintained as is an indicator of the kind shown in Figs. 4, 5 and 6.

Figure 8:
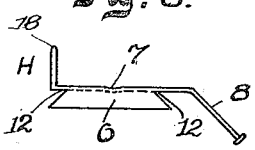
Fig. 8 represents a side elevation of the indicator shown in Fig. 5.

As a further means of maintaining the indicators a depression 7 (see Fig. 8) may be formed therein so as to form a construction in the clips or hooks formed by the inwardly turned edges 6.

To minimize the effects of parallax, the pointed end of the indicator may be continued in the form of a wire 8 (see Fig. 4) bent downwardly so as to be almost in contact with the surface of the chart and is preferably provided at its outer end with a ball or knob so as to prevent damage to the chart.

The indicators may be in any suitable design to represent some special object or to serve as a signal. The indicators may be fastened transversely of the wires as at G, Fig. 1, by forming undercuts 12 in the clips or hooks, the distance between the inner ends of the undercuts 12 being slightly greater than the distance apart of the wires.

In the arrangement shown in Fig. 1, two adjacent indicators cannot pass one another. To overcome this the wires may be arranged as shown in Fig. 9, the indicators being mounted on the wires that are differently spaced.

As illustrated in Figs. 10 and 11, the rectangular frame 10 is provided with a skeleton frame 13 mounted over the frame 10 and serving as a shield to protect the wire straining and holding means.

This apparatus may be constructed with two series of wires stretched at right angles, so that the indicators may be moved in directions mutually at right angles. The preferred embodiment of this form is illustrated in Figs. 12 to 14, in which there is added to the frame 10 a similar frame 20 superposed on the frame 10, the frame 20 being like the frame 10 except that the wire stretchers and holders are connected with the side bars of the frame instead of the end bars thereof. These frames are preferably hinged together as illustrated in the figures referred to.

By this invention, it is possible to show easily the altered positions of objects from time to time by sliding the indicators into different positions on the wires, at the same time graphically indicating their previous position or positions by means of indicators differently colored or shaped.

It will also be apparent that by the use of this invention a chart or its mounting is in no way damaged or marked as is the case when pins or like indicators are stuck into the chart, or the chart is marked by means of ink, pencil, or the like.

Having now particularly described and ascertained the nature of my said invention and in what manner the same is to be performed, I declare that what I claim is:—

1. An indicating apparatus for charts comprising a frame adapted to be placed over the chart, an adjustable stretcher bar movable on said frame, parallel wires connected with said stretcher bar and with an opposite bar of said frame, means for adjusting said stretcher bar, and indicators each engaging two of said parallel wires and movable between them.

2. An indicating apparatus for charts comprising a frame adapted to be placed over the chart, an adjustable stretcher bar movable on said frame, parallel wires connected with said stretcher bar and with an opposite bar of said frame, means for adjusting said stretcher bar, and indicators each engaging two of said parallel wires and movable between them and provided with a pointer extending downward between said wires.

3. An indicating apparatus for charts comprising a frame adapted to be placed over the chart, an adjustable stretcher bar movable on said frame, parallel wires connected with said stretcher bar and with an opposite bar of said frame, means for adjusting said stretcher bar, and indicators each engaging two of said parallel wires and movable between them and provided with a pointer extending downward between said wires and with an upward lug adapted to serve as a moving handle.

4. An indicating apparatus for charts comprising superposed frames each provided with a movable stretcher bar and with means for adjusting said stretcher bar, parallel wires stretched from the movable bar of each frame to an opposite bar thereof, the wires of one frame being disposed at right angles to the wires of the other frame, and indicators each engaging two of said parallel wires and movable between them.

In testimony whereof I affix my signature in presence of two witnesses.

JEAN HENRI ADRIEN MORICHARD.

Witnesses:
H. T. JORRITTENA,
D. C. GLENN.

Copies of this patent may be obtained for five cents each, by addressing the "Commissioner of Patents. Washington, D. C."